United States Patent [19]
Alves et al.

[11] Patent Number: 5,109,438
[45] Date of Patent: Apr. 28, 1992

[54] DATA COMPRESSION SYSTEM AND METHOD

[75] Inventors: James F. Alves, Calabasas; Jerry A. Burman, Westlake Village, both of Calif.

[73] Assignee: Hughes Aircraft Company, Los Angeles, Calif.

[21] Appl. No.: 514,778

[22] Filed: Apr. 25, 1990

[51] Int. Cl.$^5$ .............................................. G06K 9/00
[52] U.S. Cl. ..................................... 382/56; 358/433; 382/34
[58] Field of Search ................ 382/36, 9, 56, 34; 128/704; 358/432, 433

[56] References Cited
U.S. PATENT DOCUMENTS

| | | | |
|---|---|---|---|
| 3,980,809 | 9/1976 | Cook | 358/433 |
| 4,205,341 | 5/1980 | Mitsuya et al. | 358/433 |
| 4,281,312 | 7/1981 | Knudson | 382/56 |
| 4,553,171 | 11/1985 | Holladay et al., | 358/433 |
| 4,620,233 | 10/1986 | Ogawa et al. | 358/433 |
| 4,831,659 | 5/1989 | Miyaoka et al. | 382/56 |
| 4,947,447 | 8/1990 | Miyaoka et al. | 382/56 |

*Primary Examiner*—Leo H. Boudreau
*Attorney, Agent, or Firm*—C. D. Brown; R. M. Heald; W. K. Denson-Low

[57] ABSTRACT

Image data compression is implemented by partitioning an image into relatively small blocks of pixels, matching each block to an orthogonal icon, and extracting attributes associated with the icon. A table of these orthogonal icons and attributes represents a data compressed image. Each block is processed separately from all other blocks. Orthogonal processing is used to preserve orthogonal features while attenuating non-orthogonal features. An optimum set of orthogonal icons and an optimum set of attributes for each icon further improves data compression and fidelity. The optimal set of orthogonal icons includes a flat icon, an edge icon, a ribbon icon, a corner icon, and a spot icon. An optimal set of attributes includes average intensities, intensity transition position and separation, and angle of the principal axes.

10 Claims, 2 Drawing Sheets

DATA COMPRESSION SYSTEM AND METHOD

BACKGROUND

The field of the invention relates generally to data compression, and more particularly, to data compression for images.

Image data compression techniques are typically used to reduce the storage requirements for image data bases, reduce the bandwidth required to transmit images, or to facilitate image analysis. Conventional image compression techniques include bit string encoding schemes, including linear predicitive coding or vector quantization algorithms, spatial filters including low-pass filter gradient filtering and median filtering, or temporal processing schemes including change detection algorithms. None of these conventional image data compression techniques simultaneously possesses the following characteristics: (1) they do not implement relatively simple processing for image compression, (2) they do not provide for highly compressed image representations that can be easily de-compressed into good fidelity images, and (3) they do not use a format that provides for automated image analysis.

SUMMARY OF THE INVENTION

In order to overcome the above-cited limitations, the present invention provides for an improvement in image data compression, using relatively simple processing to significantly reduce the amount of data needed to represent an image and to preserve the important features of the image. The advantages of the invention are achieved by partitioning an image into relatively small independent blocks of pixels, by matching and classifying each block with an orthogonal icon, and by extracting attributes associated with the icon. An output table of these orthogonal icons and attributes represents a data compressed image. A wide range of spatial frequency features are preserved with good fidelity by the orthogonal icons and related attributes. Data compression of up to 50 times reduction in the amount of data necessary to represent an image has been achieved while preserving the pertinent features of the image. The use of an optimum set of orthogonal icons and an optimum set of attributes for each icon further improves data compression and fidelity.

A preferred embodiment of a data compression system comprises an input memory employed to store an image, and a partitioning circuit is coupled to the input memory that is adapted to partition the image into a plurality of blocks. A principal axes processor is coupled to the partitioning circuit and is adapted to generate a principal axis angle parameter for each of the plurality of blocks. A projection processor is coupled to the partitioning processor and generating a projected signal for each of the plurality of blocks in response to the principal axis angle for the corresponding block. A curve fit processor is coupled to the projection processor and is adapted to generate a curve fitted signal for each of the plurality of blocks in response to the projected signal for the corresponding block. A classification processor is coupled to the curve fit processor and is adapted to generate a classification parameter for each of the plurality of blocks in response to the curve fitted signal for the corresponding block. An output memory is coupled to the principal axes processor and to the classification processor for storing the principal axis angle parameter and the classification parameter for each of the plurality of blocks as a data compressed image.

Accordingly, it is a feature of the present invention to provide an improved data compression system and method. Another feature is an apparatus and method for extracting of an orthogonal icon and related attributes representing a block of pixels. Another feature is an apparatus and method for extracting a set of orthogonal icons and related attributes that is particularly suitable for representing orthogonal features of images. Another feature is an apparatus and method for independently processing respective blocks of a plurality of blocks of pixels. Another feature is an apparatus and method for parallel processing of multiple blocks of pixels.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 3a, 3b and 3c comprise a detailed diagram of a block of pixels and the manner of principal axis rotation, projection, and pulse fitting.

DETAILED DESCRIPTION

Figure 1:
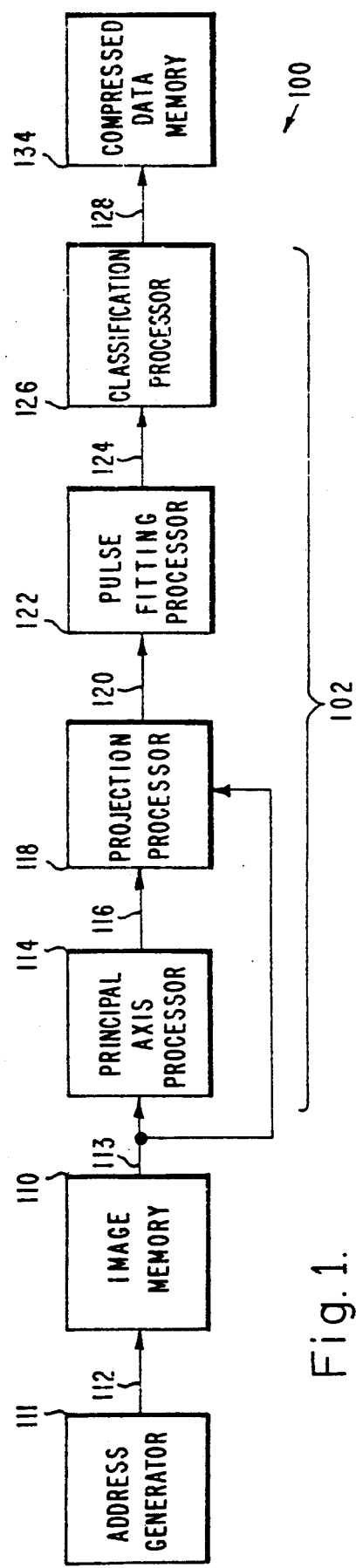
FIG. 1 is a block diagram representation of a data compression system in accordance with the principles of the present invention.

A data compression system in accordance with the principles of the present invention is shown in FIG. 1. An address generator 111 is connected to an image memory 110, which in turn is connected to data compression processor arrangement 102 in accordance with the present invention. The data compression processor arrangement 102 comprises a principal axis processor 114 that is connected to a projection processor 118, that is connected to a pulse fitting processor 122, that is connected to a classification processor 126. The image memory 110 is also coupled to the projection processor 118. The classification processor 126 is connected to a compressed data memory 134. The image memory 110 and the data compressed memory 134 are implemented as different portions of the same memory and the processors 114, 118, 122, and 126 are implemented as time shared operations partitioned between several stored program processors.

The image memory 110, operating under control of addresses 112 generated by the address generator 111, is implemented as a two dimensional memory map for storing a two dimensional image having 1,000 rows by 1,000 columns of pixels (1,000,000 pixels). The stored image is partitioned by the address generator 111 into 10,000 blocks arranged in a two dimensional memory map array of 100 rows by 100 columns of blocks with each block having a two dimensional array of 10 rows by 10 columns of pixels. The block partitioning is implicit in the accessing of each 10 by 10 array of pixels in response to block partition addresses generated by the address generator 111.

The address generator 111 performs the function of a partitioning circuit, generating addresses to access each block of pixels, shown as pixel intensity signals 113, from the image memory 110. The image is implicitly partitioned into an array of 100 by 100 blocks which are accessed in a raster scan form of 100 blocks per line of blocks on a line by line basis for each of 100 lines of blocks. Each block is identified by a block base address, which is the address of the pixel in the top left corner of the 10 by 10 pixel block. To facilitate principal axis alignment or rotation and projection, discussed in more detail hereinafter, an array of 14 by 14 pixels is accessed having a two pixel frame around a block of 10 by 10 pixels. The frame permits the block of pixels to be aligned or rotated to facilitate projection along principal axes of the block. Such rotation involves a factor of 1.4 associated with the ratio of the block side to the block diagonal. The two pixel frame overlaps between adjacent blocks while the 10 by 10 pixel block does not overlap between adjacent blocks.

The address generator 111 advances the block base address on a block-by-block basis (ten pixels at a time) for each row. As each row of blocks is accessed, advances, the block base address on a block row by block row basis (ten pixels at a time) to access each row of blocks. For each block, the address generator 111 advances the pixel address in the selected block on a pixel-by-pixel basis (one pixel at a time) for each row of pixels. As each row of pixels is accessed, advances the pixel address on a pixel row by pixel row basis (one pixel at a time) to access each row of pixels. Accessing of each block is accomplished by generating the same raster scan sequence of pixel addresses for each block and by indexing the pixel addresses with the block base address for the particular block. A block of pixels accessed from the image memory 110 by the address generator 111 is stored in a local buffer memory and processed by the processors 114, 118, 122, and 126. Because the present invention provides for processing of each block of pixels independent of each other block of pixels, the sequence of accessing the blocks from the image memory 110 is not critical and parallel processing of independent blocks is facilitated.

The principal axis processor 114 processes each block of pixel intensity signals 113 to generate an angle $\phi$ representative of the angle of the principal axis of the block, which is the axis of intensity symmetry of the block. The projection processor 118 processes each block of pixel intensity signals 113 to generate two orthogonal projected pulse signals 120 by projecting the pixels in the block 113 along the orthogonal principal axes rotated through the rotation angle $\phi$ generated by the principal axis processor 114. The orthogonal projected pulse signals are simple waveforms comprising ten intervals, each interval being a projection of the ten pixels in a row or in a column of pixels in the block. The magnitude of the waveform for a particular interval is calculated by summing the ten pixel intensities projected onto that interval.

The pulse fitting processor 122 processes the two orthogonal projected pulse signals 120 generated by the projection processor 118 to generate two ideal pulse signals 124. One of a set of ideal pulse signals (flat, single transition, and double transition signals) is selected as best fitting each of the orthogonal signals. A least squares fit is used to select the ideal pulse signal assigned to each of the orthogonal projected pulse signal. The classification processor 126 processes the two ideal pulse signals 124 to generate a symbol icon 128 and one or more attributes associated with the symbol icon 128. A CLASSIFICATION MATRIX is presented below that relates all combinations of the two ideal pulse signals to a particular orthogonal icon. The compressed data memory 134 stores the symbol icons and the related attributes generated by the classification processor 126 as a compressed image in the form of a table.

Figures 2A, 2B, 2C, 2D, 2E:
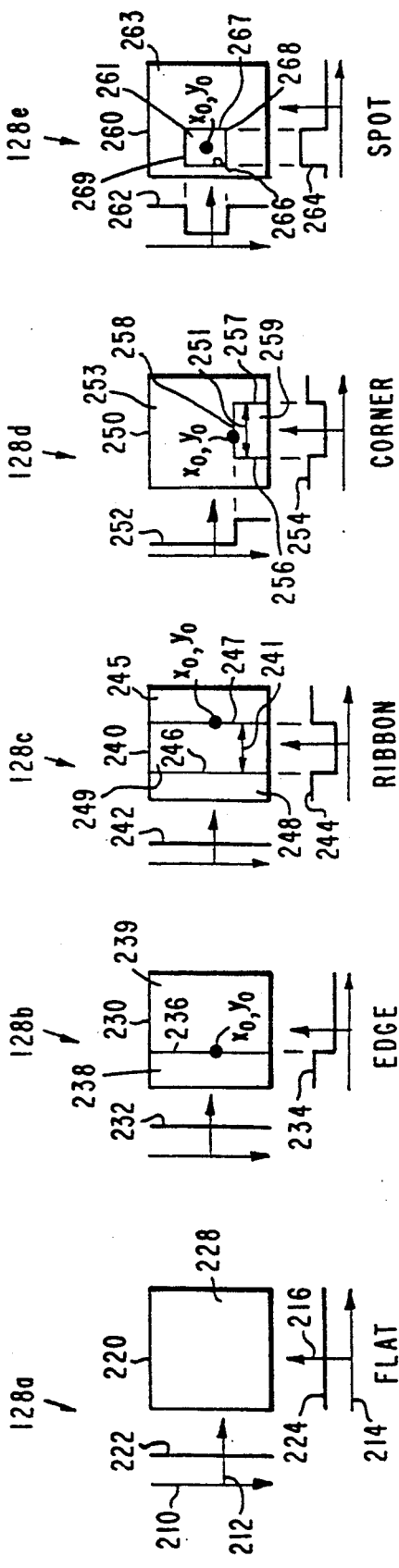
FIGS. 2A-2E comprise a detailed diagram of symbolic icon types and the related projected pulse signals.

A plurality of orthogonal icons 128 in accordance with the principles of the present invention are shown in FIGS. 2A to 2E. FIG. 2A shows a flat icon 128a, FIG. 2B shows an edge icon 128b, FIG. 2C shows a ribbon icon 128c, FIG. 2D shows a corner icon 128d, and FIG. 2E shows a spot icon 128e. The icons 128 are shown with the principal axes parallel to the axes of the block of data pixels. A vertical axis 210 is shown to the left of each block with an arrow pointing downward and having a positive amplitude direction indicated by an arrow 212 orthogonal thereto and a horizontal axis 214 is shown underneath each block of pixels with an arrow pointing rightward and having a positive amplitude direction indicated by an arrow 216 orthogonal thereto. The projection of intensity transitions onto the orthogonal axes 210, 214 is represented by dashed lines between the block 230 and the projected pulse signal 234 in FIG. 2B. The principal axis processor 114 determines the angle $\phi$ between the principal axes of the intensity distribution in the block of pixels 230 and the axes of the block of pixels 230 as one of the attributes of the icon 128 and as the axis of projection by the projection processor 118. Then, the projection is rotated through the $\phi$ angle so that it is performed along the principal axes. 210, 214

A family of icons have been created to be consistent with the types of features that they are intended to detect. The flat icon 128a (FIG. 2A) is matched to a block of pixels 220 that has no discernible structure or that is roughly uniform or specular in intensity distribution. The flat icon 128a does not have any edges and hence projects onto the two flat projected pulse signals 222, 224. The edge icon 128b (FIG. 2B) is matched to the block of pixels 240 whose dominant structure is a single step transition in intensity. The edge icon 128b has a single edge 236 which projects onto a single transition projected pulse signal 234 and onto a flat projected pulse signal 232. The ribbon icon 128c (FIG. 2C) is matched to a block of pixels 230 whose dominant structure consists of two parallel but oppositely directed step transitions in intensity. The ribbon icon 128c has two edges 246-247 which project onto a double transition projected pulse signal 244 and onto a flat projected pulse signal 242. The corner icon 128d (FIG. 2D) is matched to a block of pixels 250 whose dominant structure consists of two orthogonally intersecting step transitions. The corner icon 128d has three edges 256-258 where the single edge 258 projects onto a single transition projected pulse signal 252 and where the pair of double edges 256-257 project onto a double transition projected pulse signal 254. The spot icon 128e (FIG. 2E) is matched to a block of pixels 260 whose dominant structure consists of a small area which is significantly different in intensity than the rest of the region. The spot icon 128e has four edges 266-269 where the first pair of double edges 268-269 project onto a double transition projected pulse signal 262 and where the second pair of double edges 266-267 project onto a double transition projected pulse signal 264.

Orthogonal icons 128 have important advantages, particularly in data compressing of images having manufactured objects, such as a vehicle or a structure, in contrast to natural objects, such as a hill or a tree. The set of orthogonal icons 128 shown in FIGS. 2A-2E have combinations of a flat ideal pulse signal having no transitions, a single transition ideal pulse signal, and a double transition ideal pulse signal. The CLASSIFICATION MATRIX having all possible combinations of these three ideal pulse signal types is presented below. By reducing a block of pixels to a pair of projected pulse signals and classifying the pair of projected pulse signals by matching to a symbol icon 128 facilitates replacing a block of 100 pixels each having one or more pixel parameters with a single icon 128. Additional data compression precision is achieved by supplementing the single icon 128 with one or more attributes, still preserving significantly data compression economy over the 100 pixel block.

Figure 3C:
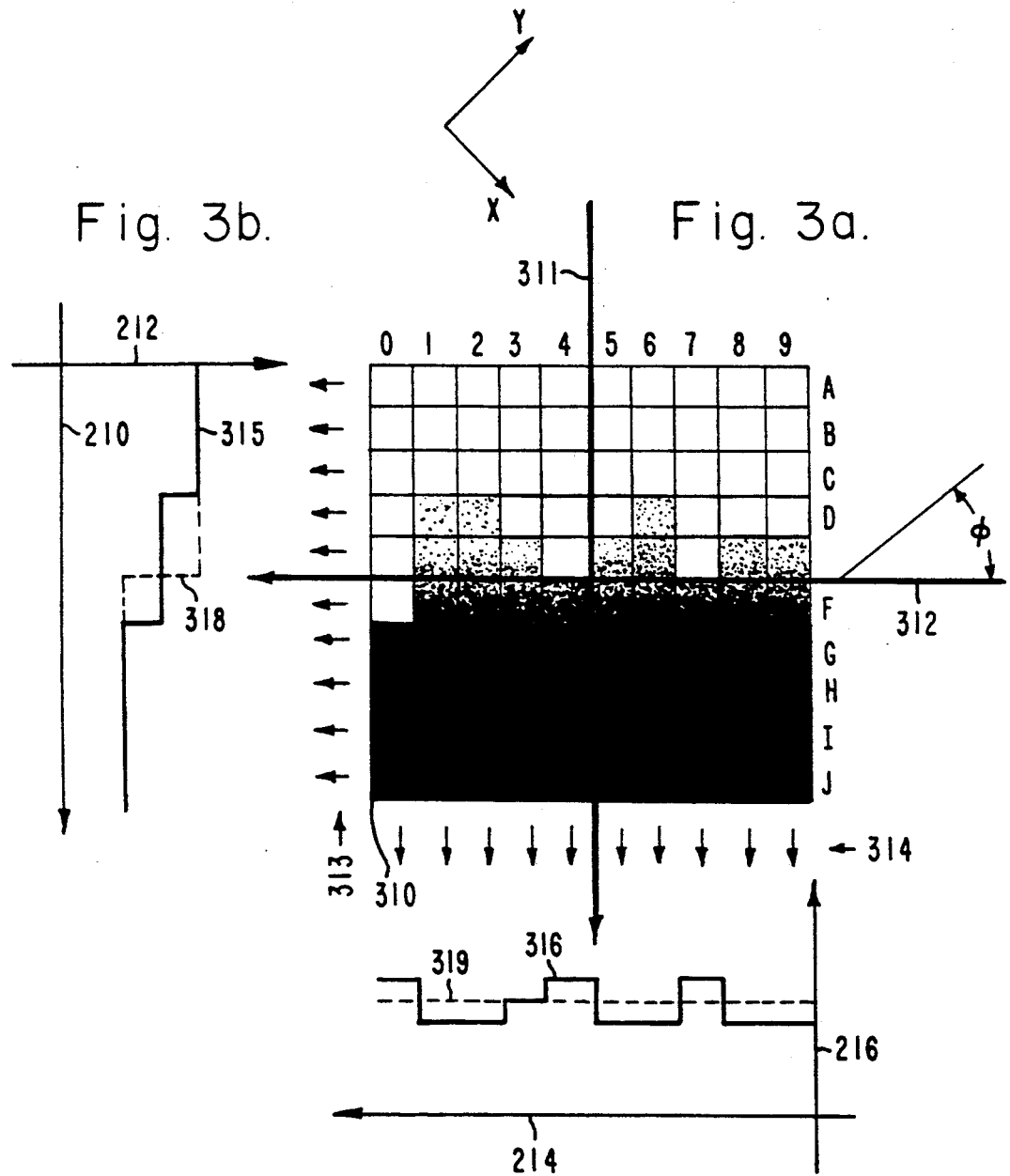

Details regarding processing of a block of pixels in accordance with the principles of the present invention is shown in FIG. 3a. A 10 by 10 block of pixels, for example, having an intensity pattern, illustrated by the darkness of the pixel squares in the block, is projected along the principal axes 311, 312 that are rotated by an angle $\phi$ to be aligned with the intensity pattern of the block. The pixels are shown arrayed in rows A to J and columns 0 to 9. A pixel is identified by the row and column designation. The angle of the principal axis $\phi$ is calculated from moment of inertia equations used in the mechanics art. First, the rectangular block is clipped to a circular block to enhance boundary symmetry. Second, the moments of inertia about the x-axis ($I_x$) and the y-axis ($I_y$) and the product of inertia ($I_{xy}$) are calculated by the following equations:

$$I_x = \int\int y^2 \cdot f(x,y) dxdy, \quad I_y = \int\int x^2 \cdot f(x,y) dxdy, \text{ and}$$
$$I_{xy} = \int\int x \cdot y \cdot f(x,y) dxdy.$$

In mechanics, $f(x,y)$ is the mass per unit area at location $(x,y)$. In this image configuration, $f(x,y)$ is the intensity per unit area at location $(x,y)$. Third, the angle of the principal axis $\phi$ is calculated from the moment and product of inertia equations from the following equation:

$$\phi = (\tfrac{1}{2})[ARCTAN(-2I_{xy}/(I_x - I_y))]$$

Projection along the principal axes 311-312 to derive the projected pulse signals 315-316 (shown in FIGS. 3b and 3c) is performed by the projection processor 118. The intensity of each of the pixels in a row, as indicated by the arrows 313, is summed to generated projected points on the pulse signal 315 and the intensity of each of the pixels in a column, as indicated by the arrows 314, are summed to generate projected points on the pulse signal 316. For example, each of the ten row pixels A0-A9 are summed to generate the amplitude of the leftmost point or interval on the pulse signal 315, each of the ten row pixels B0-B9 are summed to generate the amplitude of the next point or interval on the pulse signal 315, and so forth for each of the ten rows A-J, generating the pulse signal 315. Similarly, each of the ten column pixels A0-J0 are summed to generate the amplitude of the leftmost point or interval on the pulse signal 316, each of the ten column pixels A1-J1 are summed to generate the amplitude of the next point on the pulse signal 316, and so forth for each of the ten columns 0-9 generating the pulse signal 316.

Fitting of the projected pulse signals 315-316 to match the ideal pulse signals is performed by the pulse fitting processor 122. The raggedness of the pixel intensities in the block 310 is reflected in the raggedness or steps (solid lines) in the projected pulse signals 315-316. Each of the projected pulse signals is associated with the best fit ideal pulse signal in preparation for classification. For example, the double stepped projected pulse signal 315 is fitted to a single step ideal pulse signal 318 (dashed lines) and the multiple up and down stepped projected pulse signal 316 is fitted to a flat ideal pulse signal 319 (dashed lines). This is performed with a least squares fit calculation performed in the pulse fitting processor 122.

Classification of the symbolic icons is performed by the classification processor 126. The number of transitions in a best fit pulse signal classifies the pulse signal as either a no transition or flat pulse signal, a single transition pulse signal, or a double transition pulse signal. Classification of the block as one of the icon types is performed by a table lookup using the best fit classification of the two projected pulse signals as the input to the CLASSIFICATION MATRIX.

| | | CLASSIFICATION MATRIX FIRST AXIS ICON | | |
|---|---|---|---|---|
| | | FLAT | 1-TRANS | 2-TRANS |
| SECOND | FLAT | FLAT | EDGE | RIBBON |
| AXIS | 1-TRANS | EDGE | CORNER | CORNER |
| ICON | 2-TRANS | RIBBON | CORNER | SPOT |

The matrix points in the CLASSIFICATION MATRIX are defined by the icons in FIGS. 2A to 2E with the exception of the center matrix point having two single transition pulse signals. Consistent with the method of classifying all of the block conditions with one of the five icons, this center condition is classified as a corner icon because it is related to a corner icon at the edge of a block.

Assigning of attributes to the icons is also performed by the classification processor 126. The selected attributes include the following. The average intensity within the processing window for the flat icon, and the position of the edge, the orientation, and the average intensity on each side of the edge for the edge icon. The position of the ribbon center, the orientation, the ribbon width, the average ribbon intensity, and the average background intensity for the ribbon icon. The position of the corner center, the orientation, the width, the length, the average corner intensity, and the average background intensity for the corner icon. The position of spot center, the orientation, the width, the length, the average spot intensity, and the average background intensity for the spot icon.

The orientation angle attribute $\phi$ 116 is obtained from the principal axis processor 114. The other attributes are extracted from the projected pulse signals. The attribute of the average intensity for a flat icon 128a is calculated by averaging the twenty intensity values of the pair of projected pulse signals 222, 224 (FIG. 2A). The attributes of the position of the edge 236 in the pulse signal 234, the position of the edges 246-247 in the pulse signal 244, the position of the edges 256-257 in the pulse signal 254, the position of the edge 258 in the pulse signal 252, the position of the edges 266-267 in the pulse signal 264, and the position of the edges 268-269 in the pulse signal 262 are available from the least squares fit performed by the pulse fitting processor 122. The width and length attributes are calculated by subtracting the two parallel transitions in the pulse signal 244 (FIG. 2C), the pulse signal 254 (FIG. 2D), and the pulse signals 262 and 264

(FIG. 2E). The center position attributes are calculated by averaging the position (one half of the sum of the two transition positions) of the two parallel transitions in the pulse signal 244 (FIG. 2C), the pulse signal 254 (FIG. 2D), and the pulse signals 262 and 264 (FIG. 2E). The attribute of the average intensity on each side of the edge is calculated by averaging the intensity values of the pulse signal 234 (FIG. 2B) to the right side of the edge and to the left side of the edge. The average background intensity attribute is calculated by averaging the intensity outside the corner, the low part of the pulse signal 252 and the high part of the pulse signal 254 in FIG. 2D), or the intensity outside the spot, the high part of the pulse signal 262 and the low part of the pulse signal 264 in FIG. 2E). The average corner or spot intensity attribute is calculated by averaging the intensity inside the corner, the high part of the pulse signal 252 and the low part of the pulse signal 254 in FIG. 2D) or the intensity inside the spot, the low part of the pulse signal 262 and the high part of the pulse signal 264 in FIG. 2E).

The attributes will now be discussed in more detail with reference to FIGS. 2A to 2E. The flat icon has a constant average exterior intensity 228. The edge icon 128b has two regions 238, 239 of different intensities. The position of the edge is defined by an arrow pointing from the center of the edge $X_0$, $Y_0$ toward the center of the block of pixels. The exterior intensity 238 is defined as being in the opposite direction relative to the arrow. The interior intensity 239 is defined as being in the same direction as the arrow. The ribbon icon 128c has an exterior intensity 245, 248 split by a ribbon of interior intensity 249. The position of the ribbon is defined by the coordinates $X_0$, $Y_0$ of the center of the inside edge of the ribbon. The width of the ribbon is defined as the length of vector 241 that is normal to the two edges and interposed between the two edges. The corner icon 128d has an exterior intensity 253 and has a corner region of interior intensity 259. The position of the corner is defined by the coordinates $X_0$, $Y_0$ of the center of the inside edge 258 of the corner. The width of the corner is defined as the length of vector 251 that is normal to the two edges and interposed between the two edges. The spot icon 128e has an exterior intensity 263 and has a spot region of interior intensity 261. The position of the spot is defined by the coordinates $X_0$, $Y_0$ of the center of the spot. The width of the spot is defined as the magnitude of the edge 267 and the length of the spot is defined as the magnitude of the edge 268.

The above discussed calculations of average inside and outside intensities for the corner and the spot are not perfect averages of the inside pixel intensities and outside pixel intensities because they are calculated from the projected pulse signals 252, 254, 262, and 264 which have been derived by summing columns or rows of pixel intensities and have already mixed some inside intensities and outside intensities. This is shown in FIGS. 2D and 2E. However, they represent a smoothed average that provides good image fidelity and provides simplicity of implementation. Alternatively, more precise inside and outside averages may be calculated by using the individual intensities from the block of pixels which have not been summed or mixed. Consequently, the transitions in the block are located by referring to the ideal pulse signals.

Many alternative embodiments may be implemented from the teachings herein. For example, the image memory 110 and the compressed memory 134 may be implemented as different memories. The processors 114, 118, 122, and 126 may be partitioned to be in separate processors, in different portions of the same processors. Also, the arrangement shown in FIG. 1 may be implemented in parallel processing form, in pipeline processing form, or in parallel pipeline processing form, for example. The processors 114, 118, 122, and 126 may be implemented by stored program processors, by special purpose hardwired processors, or in other forms. Stored program processors may be implemented by microprocessors, by array processors, by RISC processors, for example.

For simplicity of discussion, all image features are discussed relative to matching blocks to five icons 128a–128e (FIGS. 2A–2E) and generating one or more attributes for each type of icon 128. Any image feature that is detected is matched to one of these five icons 128 so that there are not any unknown conditions. The number of icons 128 and the number of attributes can be reduced, where the edge icon by itself without any attributes is sufficient to demonstrate many of the features of the present invention. Also, the system may be adapted to accommodate other types of icons 128 and other types of attributes and the number of icons 128 and the number of attributes may be increased and can be varied.

In summary, the present invention identifies and characterizes selected orthogonal features within a digital image. The image is partitioned into small blocks of pixels and then, independent of each other, each block is orthogonally matched to a predefined set of orthogonal icons. Each icon and its attributes characterizes the intensity and spatial distribution of an orthogonal feature within the related block. Selection of a particular orthogonal icon and deriving the related attributes constitutes data compression for a block.

Data compression using orthogonal icons is performed by a sequence of processing operations. The principal axis angle is computed for the image intensity data within each block of pixels in order to align the axes with the orthogonal features and thus to reduce a three degree-of-freedom feature in a block to a two degree-of-freedom feature. Next, the block is projected along the principal axes to generate two single degree-of-freedom projected pulse signals and thus to reduce a two degree-of-freedom aligned feature to a pair of single degree-of-freedom pulse signals. Next, the pair of projected pulse signals associated with the block are each fitted to an ideal pulse signal. Next, the pair of ideal pulse signals associated with the block are classified as one of a plurality of orthogonal icons, each having one or more attributes, which reduces the pair of single degree-of-freedom ideal pulse signals to point parameters. As a result, a three degree-of-freedom feature involving a block of 100 pixels, for example, and hence 100 pixel parameters, is reduced to a point feature having as few as two block parameters.

Thus there has been described a new and improved image data compression system and method. It is to be understood that the above-described embodiments are illustrative of some of the many specific embodiments that represent applications of the principles of the present invention. Clearly, numerous and varied other arrangements may be designed by those skilled in the art without departing from the scope of the invention.

What is claimed is:

1. A method of compressing an image, said method comprising the steps of:

partitioning an image into a plurality of blocks;

generating a principal axis angle parameter for each of the plurality of blocks;

generating a projected signal for each of the plurality of blocks in response to the principal axis angle for the corresponding block;

generating a curve fitted signal for each of the plurality of blocks by curve fitting the projected signal for the corresponding block;

generating a classification parameter for each of the plurality of blocks by classifying the curve fitted signal for the corresponding block; and storing the principal axis angle parameter and the classification parameter for each of the plurality of blocks as a data compressed image.

2. A data compression system comprising:

means for providing data representative of an image;

a partitioning circuit connected to said means for providing data, for partitioning the image into a plurality of blocks;

a classification processor connected to the means for providing and to the partitioning circuit and adapted to generate a plurality of classification parameters, each classification parameter related to a corresponding one of the plurality of blocks;

a principal axis processor connected to the partitioning circuit and computing the principal axes of each of the plurality of blocks, wherein the classification processor is further connected to the principal axis processor and generates each classification parameter related to a corresponding one of the plurality of blocks in response to the principal axis computed by the principal axis processor; and an output circuit connected to the classification processor and adapted to generate a data compressed image comprising the plurality of classification parameters.

3. The data compression system of claim 2, wherein the classification processor generates each of the plurality of classification parameters independent of the generation of the other classification parameters.

4. The data compression system of claim 2 wherein the classification processor includes an orthogonal icon circuit matching each of the plurality of blocks to an orthogonal icon and a classifier circuit generating the classification parameter for each of the plurality of blocks in response to the orthogonal icon that is matched to the corresponding block.

5. The data compression system of claim 2 wherein the classification processor includes a flat icon circuit matching at least one of the plurality of blocks to a flat icon having a constant intensity and includes a classifier circuit generating the classification parameter as a flat classification parameter corresponding to the at least one of the plurality of blocks that is matched to the flat icon in response thereto.

6. The data compression system of claim 2 wherein the classification processor includes an edge icon circuit matching at least one of the plurality of blocks to an edge icon having two intensity levels that are separated by an edge and includes a classifier circuit generating the classification parameter as an edge classification parameter corresponding to the at least one of the plurality of blocks that is matched to the edge icon in response thereto.

7. The data compression system of claim 2 wherein the classification processor includes ribbon icon circuit matching at least one of the plurality of blocks to a ribbon icon having a constant background intensity and having a ribbon intensity bounded by two edges and includes a classifier circuit generating the classification parameter as a ribbon classification parameter corresponding to the at least one of the plurality of blocks that is matched to the ribbon icon in response thereto.

8. The data compression system of claim 2 wherein the classification processor includes a spot icon circuit matching at least one of the plurality of blocks to a spot icon having a background intensity and having an inside intensity bounded by four edges and includes a classifier circuit generating the classification parameter as a spot classification parameter corresponding to the at least one of the plurality of blocks that is matched to the spot icon in response thereto.

9. The data compression system of claim 2 wherein the classification processor includes an attribute circuit calculating a plurality of attribute parameters, each attribute parameter related to a corresponding one of the plurality of blocks.

10. A data compression system comprising:

an input memory adapted to store an image;

a partitioning circuit connected to the input memory and partitioning the image into a plurality of blocks;

a principal axis circuit connected to the partitioning circuit and adapted to generate a principal axis angle parameter for each of the plurality of blocks;

a projection processor connected to the partitioning circuit and adapted to generate a projected signal for each of the plurality of blocks in response to the principal axis angle for the corresponding block;

a curve fit processor connected to the projection processor and adapted to generate a curve fitted signal for each of the plurality of blocks in response to the projected signal for the corresponding block;

a classification processor connected to the curve fit processor and adapted to generate a classification parameter for each of the plurality of blocks in response to the curve fitted signal for the corresponding block; and an output memory connected to the principal axis circuit and to the classification processor and adapted to store the principal axis angle parameter and the classification parameter for each of the plurality of blocks as a data compressed image.

* * * * *